May 16, 1967  M. J. LANDWEHR  3,319,408
REELS FOR FARM MACHINERY
Filed Aug. 12, 1964  2 Sheets-Sheet 1

INVENTOR.
MARTIN J. LANDWEHR
BY
M. Y. Charles

INVENTOR.
MARTIN J. LANDWEHR
BY
M. Y. Charles

United States Patent Office 3,319,408
Patented May 16, 1967

3,319,408
REELS FOR FARM MACHINERY
Martin J. Landwehr, 428 S. McComas,
Wichita, Kans. 67213
Filed Aug. 12, 1964, Ser. No. 389,012
1 Claim. (Cl. 56—220)

This invention relates to an improvement in reels for use in farm machinery such as the machine known as the combine harvester. These machines were originally built as having a separate body section in which the threshing cylinder and concave therefor was located in the front end of the body section. The machine had a laterally extending auger through and an auger therein with a crop cutting mechanism (a sickle bar and guards therefor) that would cut the crop through the length of the trough and deposit the crop in a chamber wherein the threshing cylinder and concave therefor would receive and thresh the crop. To facilitate all of this operation and make it more efficient the machine was provided with a reel that was located over the cutting sickle and front edge of the auger trough to engage the standing crop and push the crop into the sickle where the crop would be cut. After the crop is cut the reel would then push the cut crop into the auger trough whereupon the auger would then transfer the crop to one end of the trough and deposit the crop in the threshing chamber as aforesaid, there to be threshed.

The reel consisted of a revolvable shaft or tube having a pulley or sprocket wheel on one end thereof that is driven by a belt or chain, as the case may be, which in turn is driven by suitable revolving power shaft of the body portion of the machine. On the above mentioned reel tube or shaft is rigidly mounted a series of radially extending arms, the outer ends of which support a plurality of feeder bars, each of which is positioned in parallelism with and above the mentioned sickle bar. The front of the auger trough as above mentioned and all this worked very well, however this made an L-shaped machine which, when towed across the grain field by a tractor, that was attached to the front corner of the L and then in pulling the machine across the field, the auger trough, sickle mechanism and reel carried thereon would want to lag or pull back. This would throw a heavy side draft on the machine and make the machine hard to pull and would also tend to decrease the efficiency of the entire machine.

In view of the above mentioned trouble and disadvantages, the manufacturer of the machine changed the design of the machine and built the machine as having a power unit thereon that not only furnished the power for cutting and threshing the crop but also furnished the power to propel the machine across the grain field in the process of harvesting the crop, as well as propelling the machine down the road for transport purposes from one field to another.

In the advent of this new design of the machine it became apparent that other advantages were obtainable. Some of these advantages were that the same size large machine could be built so that it would require much less space in which to maneuver the machine and the above mentioned side draft in pulling the machine could be entirely eliminated. This was accomplished by re-locating the auger trough and sickle mechanism and reel structure carried thereon.

The new location of the auger, etc., as the machines are now built is that the auger trough, etc., is now positioned on the front of the threshing body section of the machine and extends outwardly on each side of the threshing body portion of the machine. This makes a balanced machine and entirely eliminates the side draft of the machine as above mentioned.

In making this change it was necessary to make the discharge of the auger trough at the center thereof so that the crop would enter the threshing chamber the same as before. This necessitated changing the design of the auger so that instead of conveying all of the cut crop to one end of the trough, the crop is now fed from both ends of the trough to the center of the trough from which point the crop is fed to the threshing cylinder the same as before, but here a new problem developed. The cut crop being fed from both ends of the trough met in the center of the trough and piled up and made large bunches of the crop which, when fed to the threshing cylinder would overload the cylinder. Some of the crop would pile up and pass over the cylinder and was therefore not threshed and would then pass on through the machine and out of the machine and be lost. This trouble, it was discovered, was due to the fact that the feed bars of the reel being held in parallelism with and over the cutting sickle would push a full sickle of the crop into the full length of the sickle. At the same instant and the crop then being further pushed in the auger trough, the two feedings of the crop coming one from each end of the trough made the above mentioned bunches of the crop that overloaded the threshing cylinder. A further study of this situation revealed the fact that the bunching of the crop could be overcome by changing the design of the reel which is the object of the invention and is embodied in the drawings in which;

Figure 1:
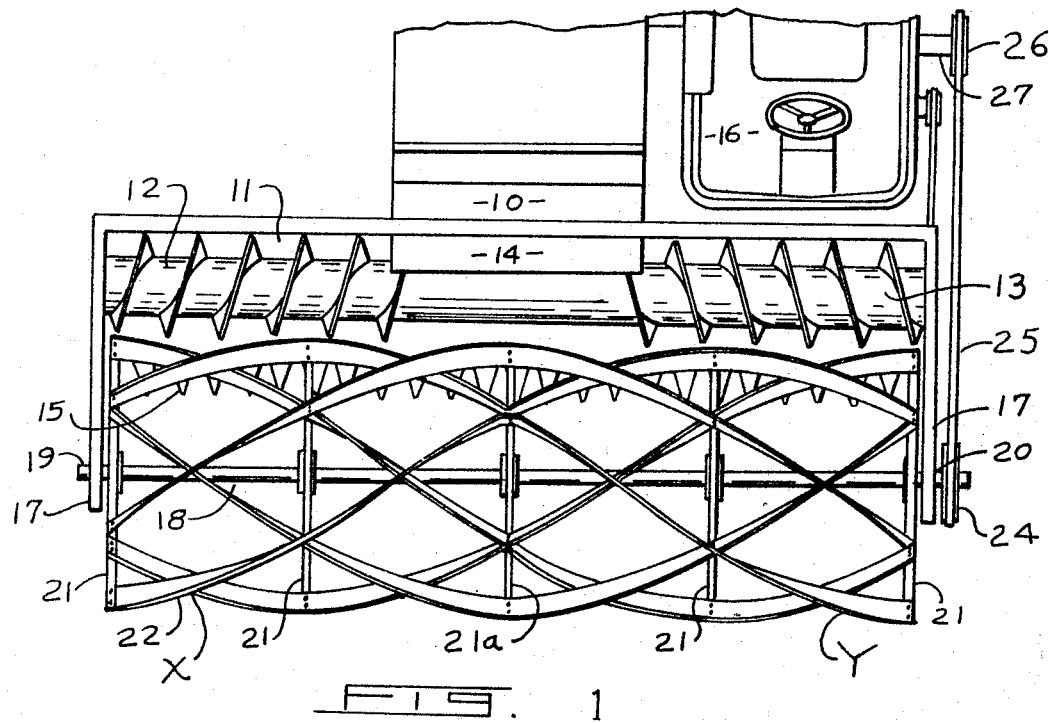
FIG. 1 is a top plan view of my improved reel structure as it is mounted on the front end of a conventional combine harvester, and showing its relation to the opposed auger elements and throat of the threshing cylinder chamber.
Figure 2:
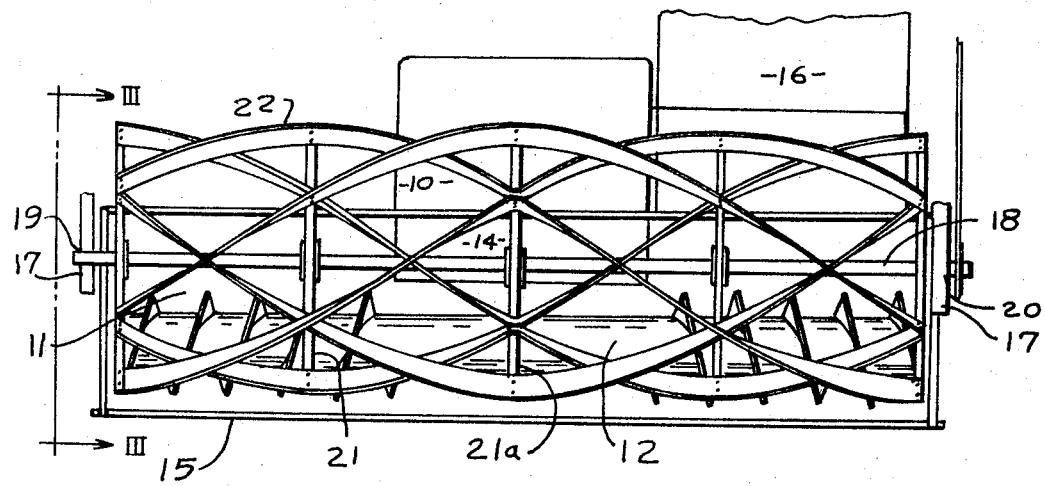
FIG. 2 is a front view of the device as shown in FIG. 1.
Figure 3:
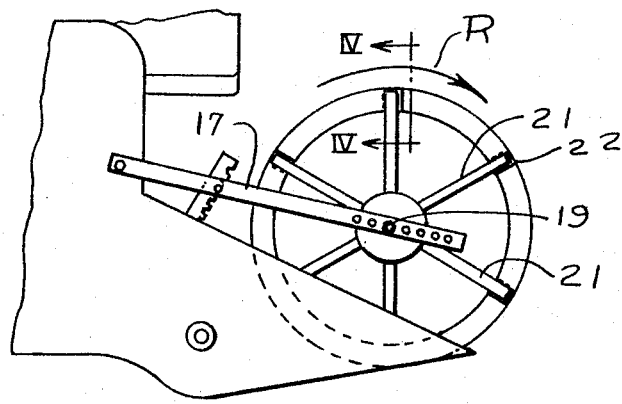
FIG. 3 is an end view of the device, the view being as seen from the line III—III in FIG. 2 and looking in the direction of the arrows.
Figure 4:
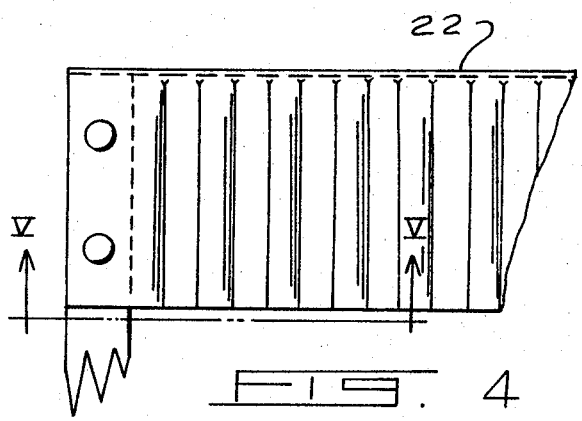
FIG. 4 is an enlarged detail view of one end of any of the guide reel slats, the view being as seen from the line IV—IV in FIG. 3 and looking in the direction of the arrows.

In the drawings is shown the combine threshing cylinder housing 10 in front of which is shown the auger trough 11 with an auger positioned therein. One portion of the auger 12 feeds from the outer end of the trough 11 and the other portion of the auger 13 feeds from the other end of the trough 11 towards the center of the trough so that both auger sections 12 and 13 feed to and discharge into the throat 14 of the threshing chamber 10. At the front edge of the auger trough 11 is shown the cutting structure 15 and at one side of the threshing chamber 10 is an operator's platform.

All of this is the conventional combine harvester construction to which I have added my improved reel device which is my invention. The reel device is carried on the usual adjustable arms 17 and consists of a center supporting axle element 18 carried in bearings 19 and 20 positioned one at each end of the axle element 18, and positioned on the supporting arms 21. One set of these arms 21a is positioned at the center of the reel structure. The device is provided with a slat structure consisting of a series of slats, each of which are made in two sections X and Y, and each slat section is bent in a portion of a spiral formation and so mounted on the radially supporting arms 21 in such a position that the slat sections X and Y begin at the outer ends and extend toward and meet each other at the center of the reel to form a spiral V-shaped slat section, each point of which is equi-distant from the center axle element 18, and is as shown. The reel in operation will revolve in the direction of the arrow R, and the direction of the slope of the slat sections S and Y are counter to the direction of the revolution R of the reel.

Figure 5:
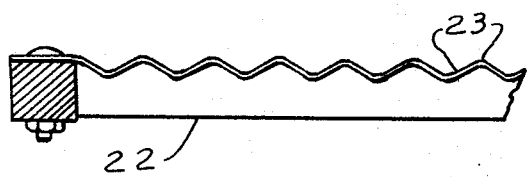
FIG. 5 is an enlarged detail sectional view through one of the guide slat supporting arms and showing one end of a guide slat connected thereto, the view being as seen from the line V—V in FIG. 4 and looking in the direction of the arrows.

Each slat section X and Y is L shaped in cross section to provide stiffness to the slat and one leg of the L is corrugated as shown at 23 in FIG. 5, so as to draw the slat into the curved formation above mentioned. On one end of the axle shaft 18 is a driven pulley 24 that is driven by a belt 25 which also engages a drive pulley 26 which is rigidly mounted on a suitable drive shaft 27 which is one of the power driven shafts of the combine machine.

The operation of the device is that as the reel revolves in the direction R, as the machine is propelled across the field, the reel slats X and Y will engage the standing crop at the points at the outer ends of the reel and push the crop into the cutting cycle mechanism 15 at points progressively approaching the center of the cycle as the machine moves along, thereby throwing a better distributed cut crop into the auger sections 12 and 13 so as to feed a more even flow of the crop to and discharge the cut crop into the throat 14 of the threshing cylinder housing 10, and because of this even flow all of the cut crop will flow under the threshing cylinder and be threshed instead of some of it over riding the cylinder and being lost as above described.

Now while the foregoing is a description of the preferred form of the structure, it is to be understood that such modifications of the structure may be employed as lie within the scope of the appended claim without departing from the spirit and intention of the invention.

What I claim is:

In a combine, a trough mounted on the front end thereof and having centrally delivering auger means therein; a throat on said combine disposed to receive material by said auger means; crop cutting means mounted on and extending forwardly of said trough; a crop gathering means adjustably mounted on said combine and disposed above and forwardly of said cutting and auger means; said gathering means extending parallel to said auger and comprising a reel having an axle, slat supporting radial arms thereon, said slats being spirally arranged to converge along a longitudinal line coextensive with said throat, to provide a V-shaped slat configuration, whereby the crop gathered by the reel is fed toward the center, severed by the cutter, delivered to the auger means and discharged to the combine throat.

References Cited by the Examiner

UNITED STATES PATENTS

| | | | |
|---|---|---|---|
| 1,441,073 | 1/1923 | English | 56—294 |
| 1,847,683 | 3/1932 | Worthington | 56—294 |
| 3,139,717 | 7/1964 | Fischer | 56—23 |
| 3,233,395 | 2/1966 | Dahl et al. | 56—192 |

ABRAHAM G. STONE, *Primary Examiner.*

ANTONIO F. GUIDA, *Examiner.*